US005774231A

United States Patent [19]
Yoshida

[11] Patent Number: 5,774,231
[45] Date of Patent: Jun. 30, 1998

[54] FACSIMILE APPARATUS WHICH CHANGES THE GENERATION TIME OF ONE LINE OF READ DATA

[75] Inventor: Takehiro Yoshida, Tokyo, Japan

[73] Assignee: Canon Kabushiki Kaisha, Tokyo, Japan

[21] Appl. No.: 270,468

[22] Filed: Jul. 5, 1994

[30] Foreign Application Priority Data

Jul. 5, 1993 [JP] Japan ..................................... 5-165630

[51] Int. Cl.⁶ .............................. H04N 1/36; H04N 1/00; G03G 15/00
[52] U.S. Cl. .......................... 358/434; 358/409; 358/412; 399/43
[58] Field of Search .................................... 358/434, 404, 358/400, 444, 474, 486, 412, 409, 401, 475; 399/43, 82, 85, 383

[56] References Cited

U.S. PATENT DOCUMENTS

| | | | |
|---|---|---|---|
| 4,805,013 | 2/1989 | Dei et al. .................................. | 358/80 |
| 4,839,741 | 6/1989 | Wilson .................................... | 358/474 |
| 4,957,689 | 9/1990 | Ohnishi et al. .......................... | 358/401 |
| 5,086,487 | 2/1992 | Katayama et al. ....................... | 382/56 |
| 5,138,672 | 8/1992 | Hirabayashi et al. .................... | 382/54 |
| 5,159,468 | 10/1992 | Yoshida et al. .......................... | 358/451 |
| 5,418,629 | 5/1995 | Miura ...................................... | 358/486 |

OTHER PUBLICATIONS

Canon Fax–L770 Instruction Book, 1990, pp. 1–23, 42–49, 82–85, 186.

*Primary Examiner*—Kim Yen Vu
*Assistant Examiner*—Kimberly A. Williams
*Attorney, Agent, or Firm*—Fitzpatrick, Cella, Harper & Scinto

[57] ABSTRACT

A facsimile apparatus includes a read unit which reads a document sheet image, and a memory which stores the read image data. A recorder records the image data on a record sheet, and a selection unit selects a first copy mode or a second copy mode. In the first copy mode, the image data read by the read means is stored in the memory, and after the completion of the storing of at least one page of image data, the image data read from the memory starts to be recorded by the recorder. In the second copy mode the image data read by the read unit starts to be recorded by the recorder before the completion of the reading of one page of a document sheet. A controller asynchronously conducts reading of the image data by the read unit and recording of the image data by the recorder when the select unit selects the first copy mode, and synchronously conducts the reading of the image data by the read unit and the recording of the recorder when the select unit selects the second copy mode.

16 Claims, 9 Drawing Sheets

FACSIMILE APPARATUS WHICH CHANGES THE GENERATION TIME OF ONE LINE OF READ DATA

BACKGROUND OF THE INVENTION

1. Field of the Invention

The present invention relates to a facsimile apparatus, and more particularly to a facsimile apparatus which can change a generation time of one line of read data.

2. Related Background Art

In the past, a generation time of one line of read data is based on a store time. Namely, since a store time of one line is fixed, the generation time of one line of read data is an integer,multiple of the store time of one line and cannot be arbitrarily set.

Accordingly, in the prior art, a recording means is set such that the generation time of one line of data is slightly shorter than a record time of one line.

However, in LBP recording the record time of one line is determined by a condition of a recording unit 1, in which the record data should be continuously supplied. In such a system, considering a copy operation of only one set, the generation time of one line of data which is shorter than the record time of one line is set and the recording is made by starting the reading. Since a memory to store the read and record data is definite, the memory becomes full in a short time because the generation time of one line of data is shorter than the record time of one line of data. Thus, the read operation is intermittent and image quality is deteriorated.

SUMMARY OF THE INVENTION

It is an object of the present invention to improve a facsimile apparatus.

It is another object of the present invention to provide a facsimile apparatus which permits copying with a coded memory and copying without a coded memory, in which in the copy mode with the coded memory, the reading of a document sheet and the recording by a printer are asynchronously preformed, and in the copy mode without the coded memory, the reading of the document sheet and the recording by the printer are synchronously preformed.

It is still another object of the present invention to provide a facsimile apparatus in which the reading of the document sheet and the recording by the printer are synchronized when only one set of copy is to be made, and the reading of the document sheet and the recording by the printer are asynchronously preformed when a plurality of sets of copies are to be made.

BRIEF DESCRIPTION OF THE DRAWINGS

FIG. 1, consisting of FIGS. 1A and 1B, is a block diagram of an embodiment of a facsimile apparatus of the present invention, FIGS. 2A, 2B-1 and 2B-2 show relations between a generation time of one line of data and a store time thereof, FIG. 3, consisting of FIGS. 3A and 3B, is a flow chart of control of a control circuit 50.

DETAILED DESCRIPTION OF THE PREFERRED EMBODIMENTS

The present invention is now described in detail in connection with an embodiment thereof.

Figures 1, 1A:
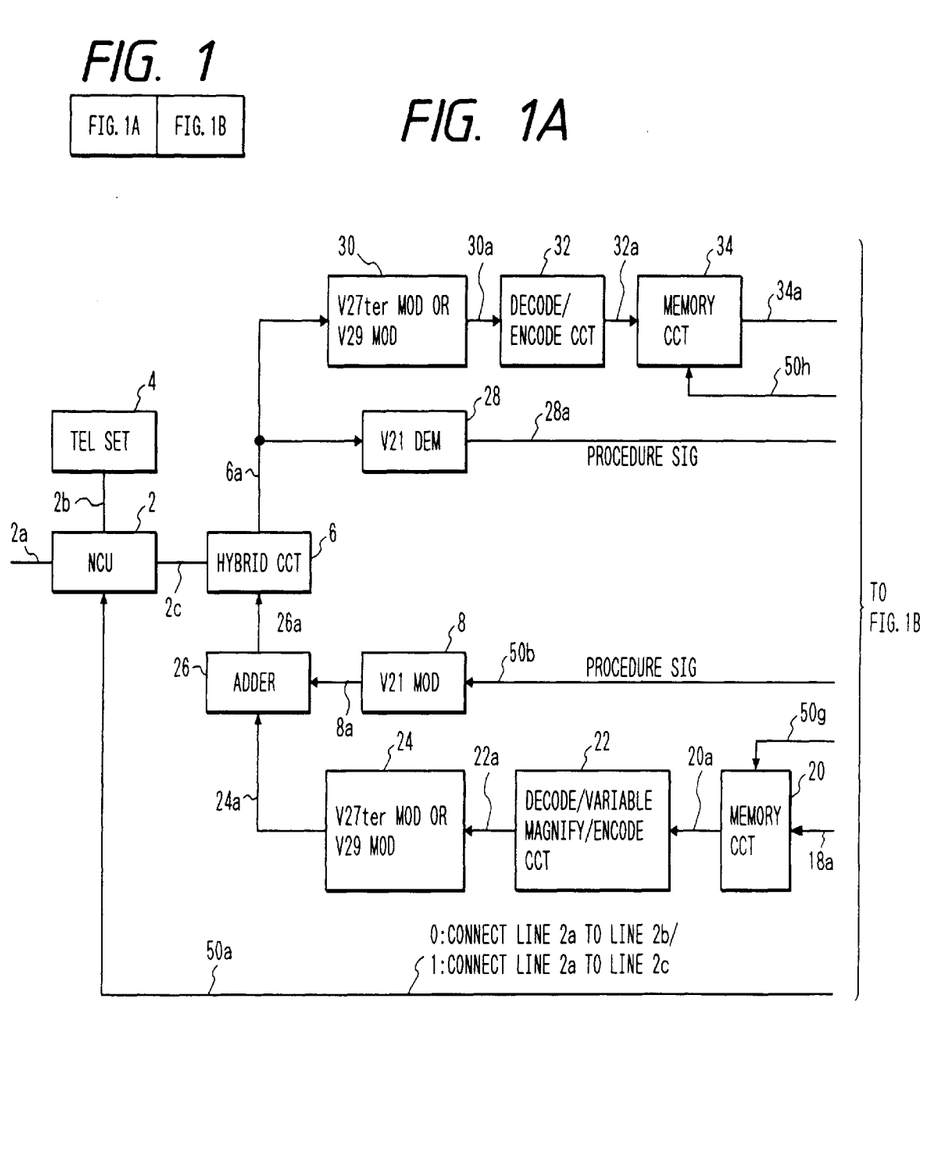
Figure 1B:
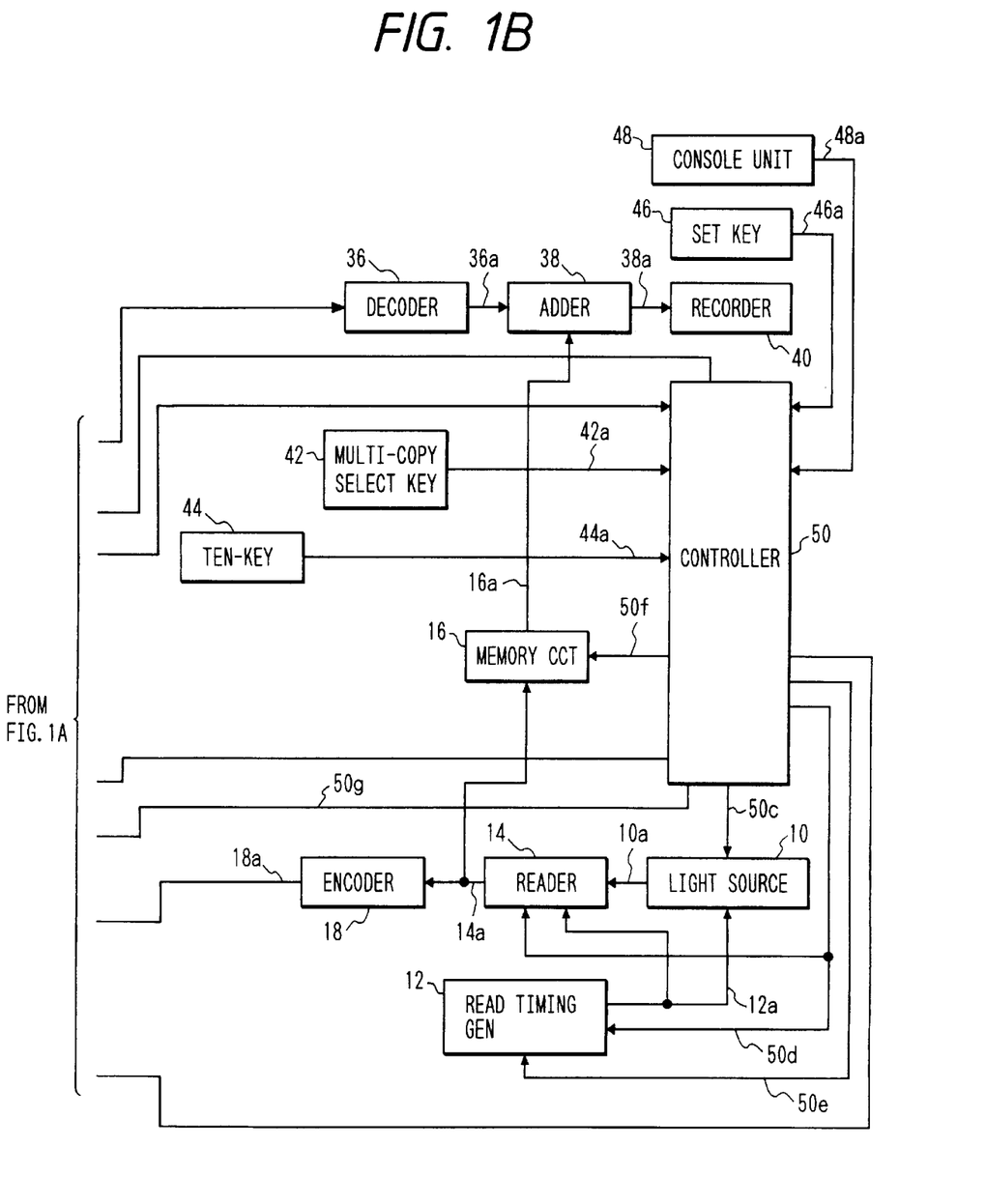

FIGS. 1A and 1B are block diagrams of the embodiment of the facsimile apparatus of the present invention.

In FIGS. 1A and 1B, numeral 2 denotes a network control unit (NCU) which connects a telephone network to a terminal of a line for use in data communication to control the connection of a telephone switching network, switch a data communication path and maintain a loop. A signal line 2a is a telephone line. The NCU 2 receives a signal from a signal line 50a and when a signal level is "0", it connects the telephone line to a telephone set 4, that is, it connects the signal line 2a to a signal line 2b. When the signal level of the signal on the signal line 50a is "1", it connects the telephone line to a facsimile apparatus, that is, it connects the signal line 2a to a signal line 2c. In a normal state, the telephone line 2a is connected to the telephone set 4.

Numeral 6 denotes a hybrid circuit for separating a transmission signal and a reception signal. Namely, a transmission signal on a signal line 26a passes through the hybrid circuit 6 to a signal line 2c and is sent to the telephone line 2a through the NCU 2. A signal sent from a partner station passes through the NCU 2 and the signal line 2c and is supplied to a signal line 6a.

Numeral 8 denotes a modulator for modulating in accordance with the known CCITT Recommendation V21. The modulator 8 receives a protocol signal on a signal line 50b, executes modulation and outputs modulated data to a signal line 8a.

Numeral 10 denotes a light source. A light intensity of the light source (for example, an LED) is determined by an analog signal on a signal line 50c. For example, when one line of data is read by 30 contact sensors and an analog value of 3 is outputted, a current of 3 mA is supplied to each LED. One line of data is stored in accordance with a timing clock outputted to the signal line 12a, and the stored information is sequentially outputted to the signal line 10a.

Numeral 12 denotes a read timing generation circuit. When a signal on the signal line 50d is received, the generation circuit 12 recognizes a generation time of one line. (For example, when an analog signal of 5 is outputted, the generation time of one line is 5 ms.) When the information on the signal line 50e is inputted, it recognizes a store time of one line. (For example, when an analog signal of 3 is outputted, the store time of one line is 3 ms.) Actual timing is outputted to the signal line 12a. When the generation time of one line is equal to the store time of one line, the timing clock is outputted to the signal line 12a at the timing of those times. For example, when both are 3 ms, the timing clock is outputted to the signal line 12a at the period of 3 ms. When the generation time of one line is longer than the store time, the clock is generated at the timing of the generation time of one line, and the timing clock is generated even after the elapse of the store time from the timing clock.

Figure 2A:
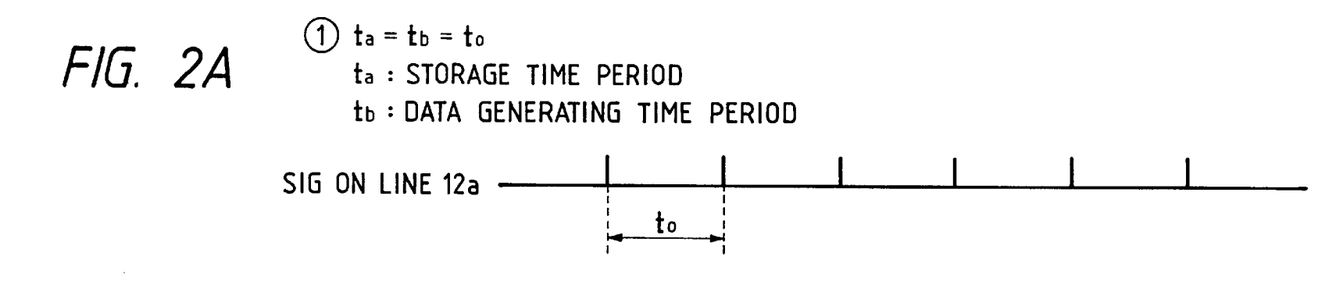
Figures 2B, 2B:
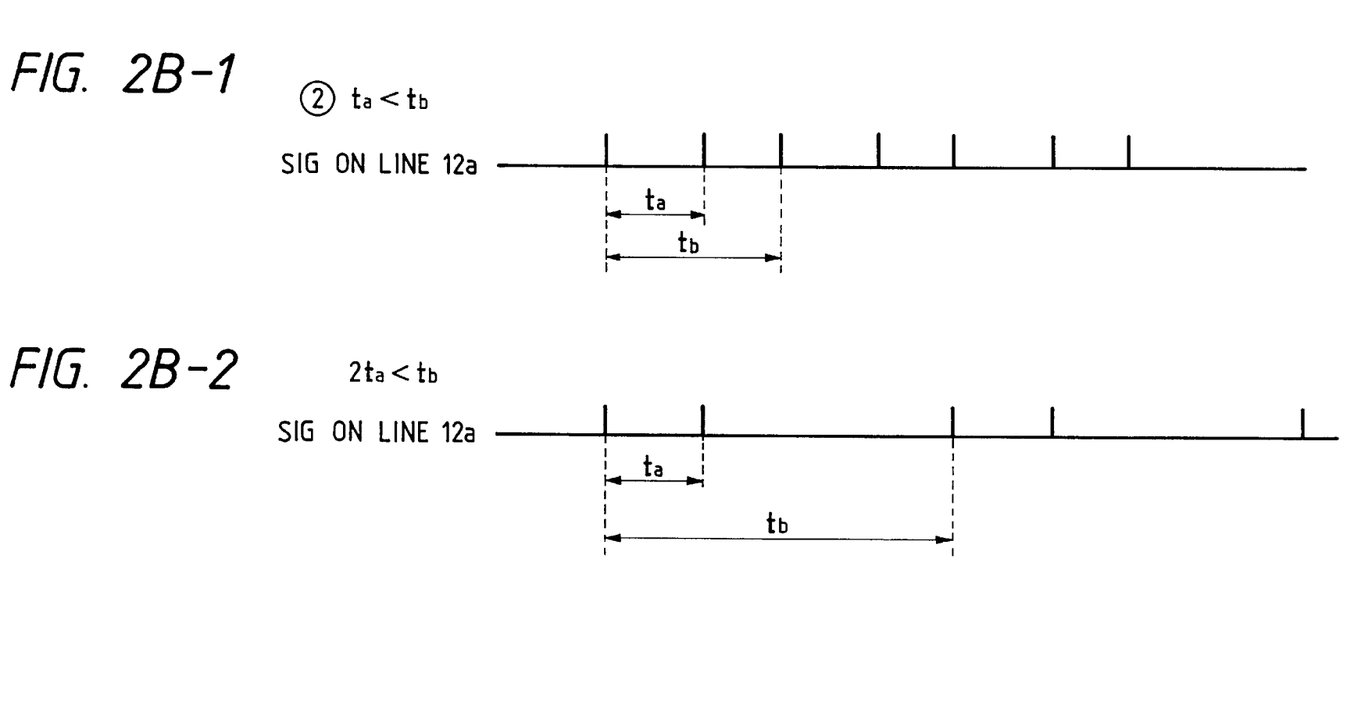

An example of the timing clock is shown in FIGS. 2A to 2B-2. In FIG. 2A, it is assumed that the store time and the generation time of one line are equal to $t_O$. In FIG. 2B-1, it is assumed that the generation time $t_b$ of one line is longer than the store time $t_a$. The time $t_b$ may be longer than $2t_a$ (See FIG. 2B-2).

Numeral 14 denotes a read circuit which sequentially reads one line of image signal along a main scan direction from a transmission document sheet to generate a signal train representing white and black binary values. It comprises an image pickup device such as a CCD (charge coupled device) and an optical system. The black and white binary signal train is outputted to the signal line 14a.

When the generation time of one line and the store time are equal, $t_O$ is always constant in FIG. 2A and data at any timing may be read. However, when the generation time $t_b$ of one line is longer than the store time $t_a$, only the data read in the store time $t_a$ in FIGS. 2B-1, 2B-2 is valid and the data read in the store time $(t_b-t_a)$ is thrown away because the store time is not correct. Namely, only the valid data is outputted to the signal line 14a.

Numeral 16 denotes a memory circuit which is a buffer for storing 150 lines of raw data, for example. The read data outputted to the signal line 14a is sequentially stored starting from a buffer 0 under the control of a signal line 50f and the record data is sequentially outputted starting from the buffer 0 to a signal line 16a.

Numeral 18 denotes an encoder which receives the read data outputted to the signal line 14a and outputs encoded (MR (modified READ) encoded with K=8) data to a signal line 18a.

Numeral 20 denotes a memory circuit. The encoded data outputted to the signal line 18a is stored in the memory circuit 20 under the control of a signal line 50g and the data stored in the memory circuit 20 is outputted to the signal line 20a under the control of the signal line 50g.

Numeral 22 denotes a decode/variable magnification/encode circuit which receives the MR encoded data with K=8 outputted to the signal line 20a, decodes it as required, change the magnification and outputs data encoded in accordance with a mode of a destination receiver to the signal line 22a.

Numeral 24 denotes a modulator which modulates in accordance with the known CCITT Recommendation V27ter (differential phase modulation) or V29 (quadrature modulation). The modulator 24 receives the signal on the signal line 22a, modulates it and outputs the modulated data to the signal line 24a.

Numeral 26 denotes an adder which receives the signals on the signal lines 8a and 24a and outputs the a signal to the signal line 26a.

Numeral 28 denotes a demodulator which demodulates in accordance with the known CCITT Recommendation V21. The demodulator 28 receives the signal on the signal line 6a, demodulates it by V21 and outputs the demodulated data to the signal line 28a.

Numeral 30 denotes a demodulator which demodulates in accordance with the known CCITT Recommendation V27ter (differential phase modulation) or V29 (quadrature modulation). The demodulator 30 receives the signal on the signal line 6a, demodulates it and outputs the demodulated data to the signal line 30a.

Numeral 32 denotes a decode/encode circuit which receives the information outputted to the signal line 30a, decodes it and outputs the MR encoded data with K=8 to the signal line 32a.

Numeral 34 denotes a memory circuit. The encoded data outputted to the signal line 32a is stored in the memory circuit 34 under the control of a signal line 50h, and the data stored in the memory circuit 34 is outputted to the signal line 34a under the control of the signal line 50h. The memory circuit 34 may be shared by the memory circuit 20. In a multiple copy mode, those memory circuits are shared.

Numeral 36 denotes a decode circuit which receives the signal outputted to the signal line 34a and outputs the encoded (MR (modified READ) encoded with K=8) data to the signal line 36a.

Numeral 38 denotes an adder which receives the data outputted to the signal lines 16a and 36a, adds them and outputs the sum to the signal line 38a.

Numeral 40 denotes a recorder which receives the data outputted to the signal line 38a and sequentially records it line by line at a constant speed. It may be an electro-photographic printer such as an LBP (laser beam printer) which cannot interrupt the record operation during the recording of one page of image data.

Numeral 42 denotes a select key for the multiple copy mode. When the key is depressed, a depress pulse is generated on a signal line 42a.

Numeral 44 denotes a ten-key key pad which outputs ten-key information 44a for a depressed key.

Numeral 46 denotes a set key. When the set key is depressed, a depress pulse is generated on a signal line 46a.

Numeral 48 denotes a console unit. When a one-touch dial key, a preset dial key, a start key or other function key is depressed, the depressed information is outputted on a signal line 48a.

Numeral 50 denotes a controller which includes read data generation means and controls the generation time of one line of read data. When the generation time of one line of read data is determined, a light intensity (a current value) of the light source (for example, LED) is selected such that the store time is equal to the generation time. Specifically, in the single copy mode, the generation time to one line of read data is set to be slightly shorter than the record time of one line, and in the memory transmission mode or the multi-copy mode in which the read information is once encoded and stored in the memory circuit 20, the generation time of one line of read data is set to be a shortest allowable read time to read the document sheet information in as short time as possible. In the direct transmission mode, one line of read data is generated in a minimum transmission time designated by the destination station. The record time of one line is, for example, 5.5 ms for a fine mode.

Figures 3, 3A:
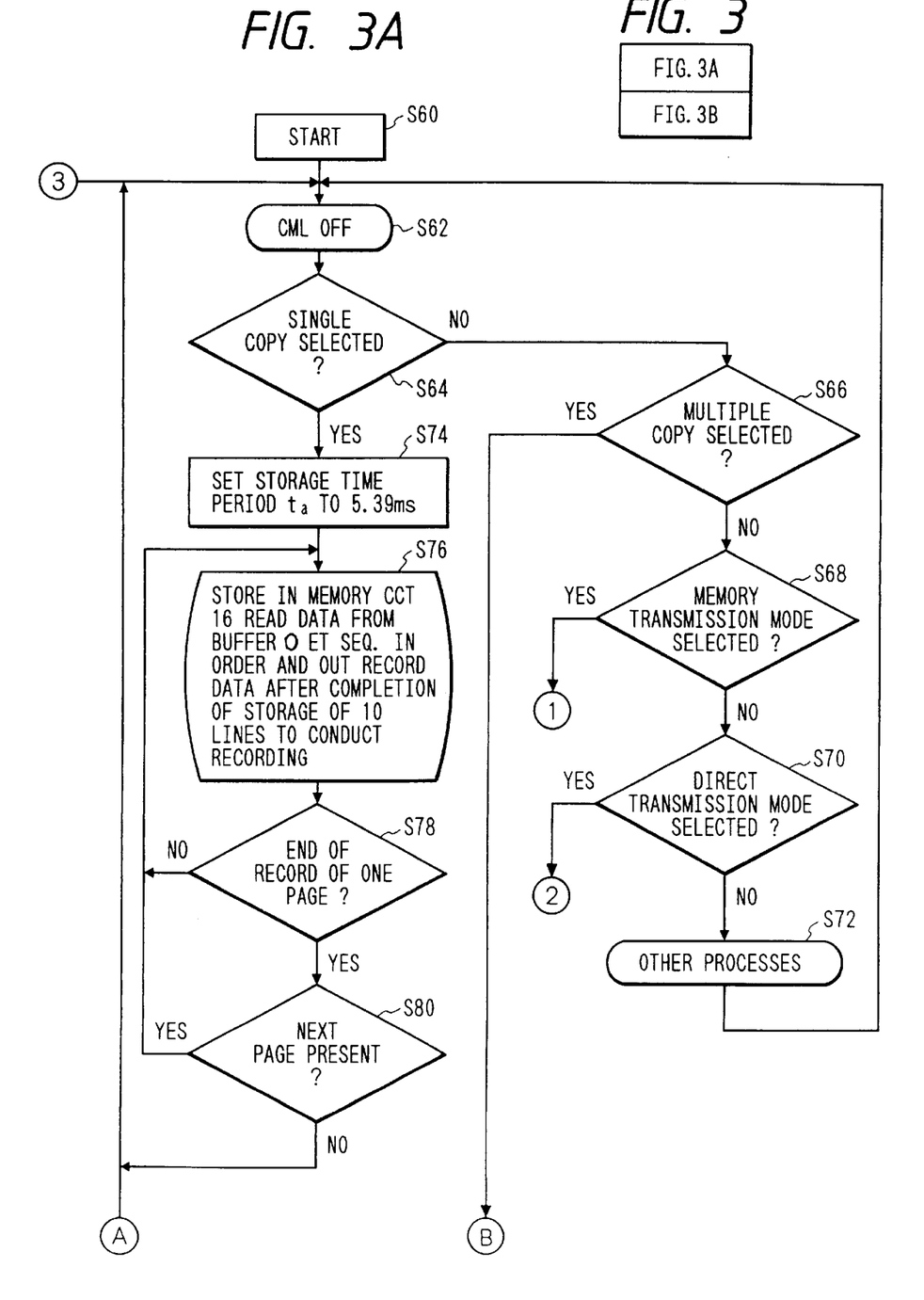
Figure 3B:
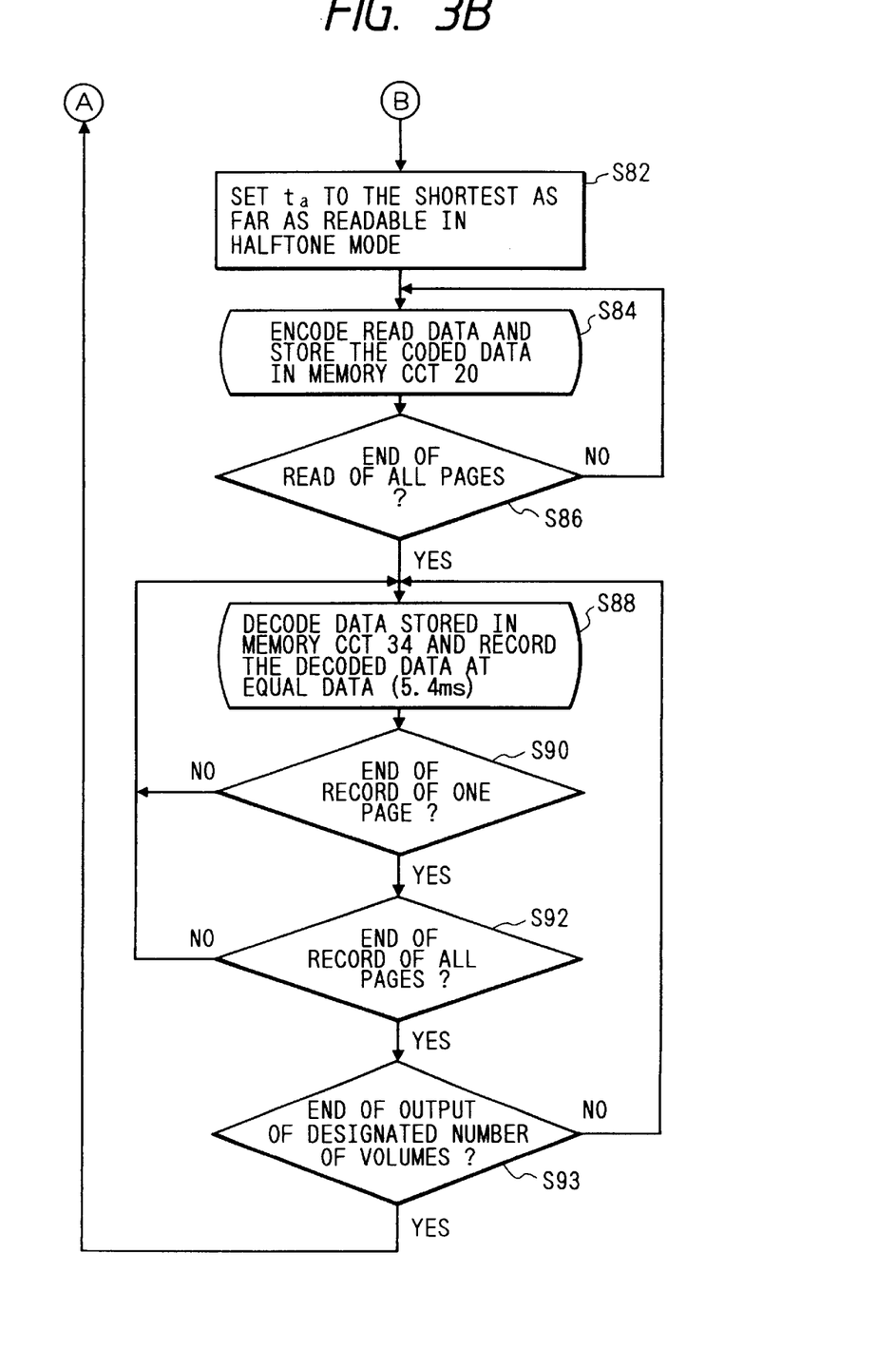

FIGS. 3A and 3B are flow charts of the control of the controller 50.

A step S60 represents a start.

In a step S62, the signal line 50a outputs a signal off level "0" to turn of a CML.

In a step S64, the signals on the signal lines 42a, 44a, 46a and 48a are received to determine if the single copy mode is selected. If it is selected, the process proceeds to a step S74, and if it is not selected, the process proceeds to a step S66.

In the step S66, the signals on the signal lines 42a, 44a, 46a and 48a are received to determine of the multiple copy mode is selected. If it is selected, the process proceeds to a step S82, and if it is not selected, the process proceeds to a step S68.

In the step S68, the signals on the signal lines 42a, 44a, 46a and 48a are received to determine if the memory transmission mode is selected. If it is selected, the process proceeds to a step S94, and if it is not selected, the process proceeds to a step S70.

In the step S70, the signals on the signal lines 42a, 44a, 46a and 48a are received to determine if the direct transmission mode is selected. If it is selected, the process proceeds to a step S110, and if it is not selected, the process proceeds to a step S72.

The step S72 represents other process.

In a step S74, the store time $t_a$ of one line is set to 5.39 ms. Specifically, 5.39 (ms) is outputted to the signal lines 50d and 50e, and 3.71 (mA) is outputted to the signal line 50c so that the store time is equal to 5.39 ms, and 3.71 mA is supplied to each of 30 LED's.

In a step S76, the read information is sequentially stored in the memory circuit 16 as raw data starting from the buffer 0 under the control of the signal line 50f, and after 10 lines of raw data have been stored, the record data is outputted to the signal line 16a under the control of the signal line 50f to sequentially record the lines in 5.4 ms per line (fine mode).

In a step S78, whether one page of recording has been completed or not is determined. If it has been completed, the process proceeds to a step S80, and if it has not been completed, the process proceeds to the step S76.

In the step S80, whether there is a succeeding page or not is determined. If there is, the process proceeds to the step S76, and if there is not, the process proceeds to the step S62.

In the step S82 (FIG. 3B), the store time of one line is set to a shortest possible time (for example, 2.5 ms) which permits the reading in the half-tone mode. Specifically, 2.50 ms is outputted to the signal lines 50d and 50e, and 8.00 (mA) is outputted to the signal line 50c so that the store time is equal to 2.50 ms, and 8.00 mA is supplied to each of the 30 LED's.

In a step S84, the read information is sequentially MR encoded with K=8 under the control of the signal line 50g and they are stored in the memory circuit 20 (or 34).

In a step S86, whether all pages have been read or not is determined, and if they have been read, the process proceeds to a step S88, and if they have not been read, the process proceeds to the step S84.

In the step S88, the information stored in the memory circuit 34 (or 20) is sequentially decoded under the control of the signal line 50h to record it at a constant speed of 5.4 ms per line.

In a step S90, whether one page of recording has been completed or not is determined, and if it has been completed, the process proceeds to a step S92, and if it has not been completed, the process proceeds to the step S88.

In the step S92, whether all pages have been recorded or not is determined. If all pages have been recorded, the process proceeds to a step S93, and if all pages have not been recorded, the process proceeds to the step S88.

In the step S93, whether the designated number of copies have been outputted or not is determined. If they have been outputted, the process proceeds to the step S62, and if they have not been outputted, the process proceeds to the step S88.

In a step S94 (FIG. 4), the store time of one line is set such that the reading is made in a shortest time in the mode (standard/fine/super fine) currently selected by the console unit. The store time of one line is outputted to the signal lines 50d and 50e and the light intensity (a current value for each of 30 LED's) corresponding to the store time is outputted to the signal line 50c.

Figure 4:
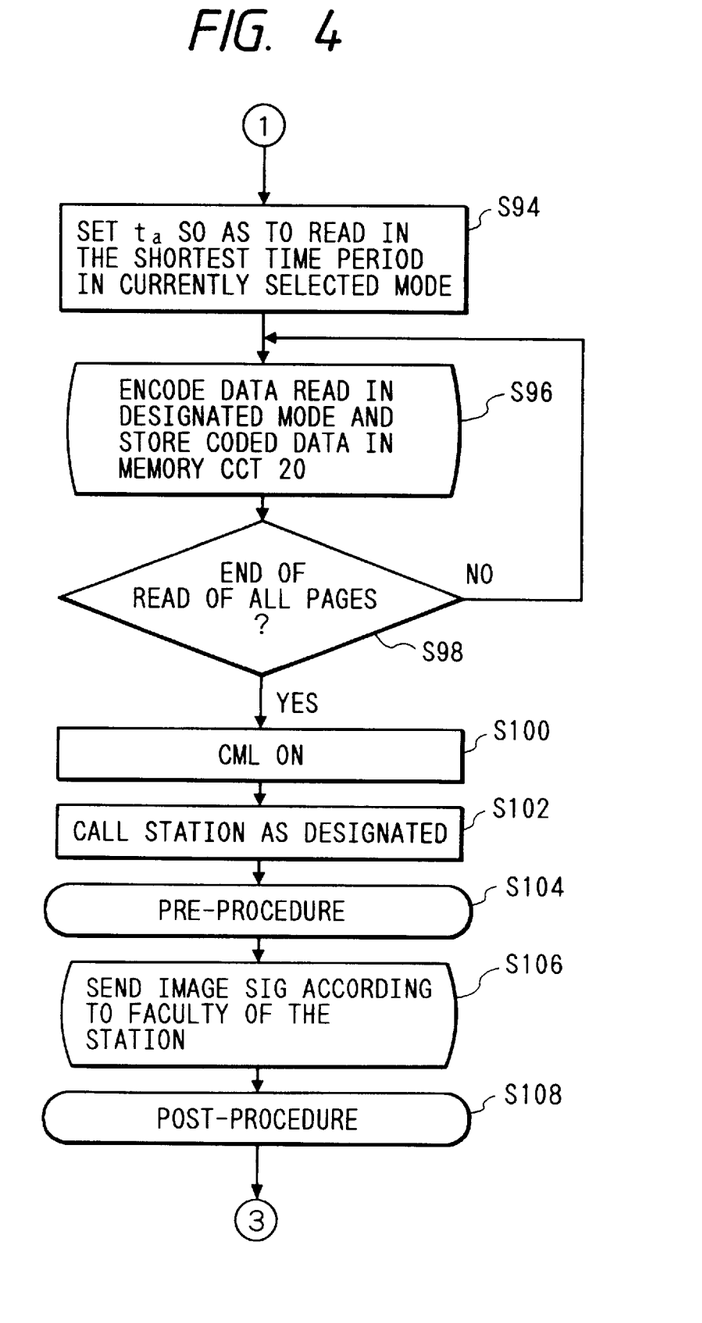
FIG. 4 is a flow chart of control of the controller 50 of FIG, 1B.

In a step S96, the read information is sequentially read in the designated mode under the control of the signal line 50g, they are MR decoded with K=8, and stored in the memory circuit 20.

In a step S98, whether all pages have been read or not is determined, and if all pages have been read, the process proceeds to a step S100, and if all pages have not been read, the process proceeds to the step S96.

In the step S100, a signal of signal level "1" is outputted to the signal line 50a to turn on the CML.

In a step S102, a call is made to the designated destination station.

A step S104 represents a pre-protocol.

A step S106 represents the transmission of the image signal under the control of the signal line 50g.

In accordance with the ability of the destination receiver, the transmission mode or encoding mode is determined and the signal is transmitted.

A step S108 represents a post-protocol.

In a step S110 (FIG. 5), a signal of a signal level "1" is outputted to the signal line 50a to turn on the CML.

Figure 5:
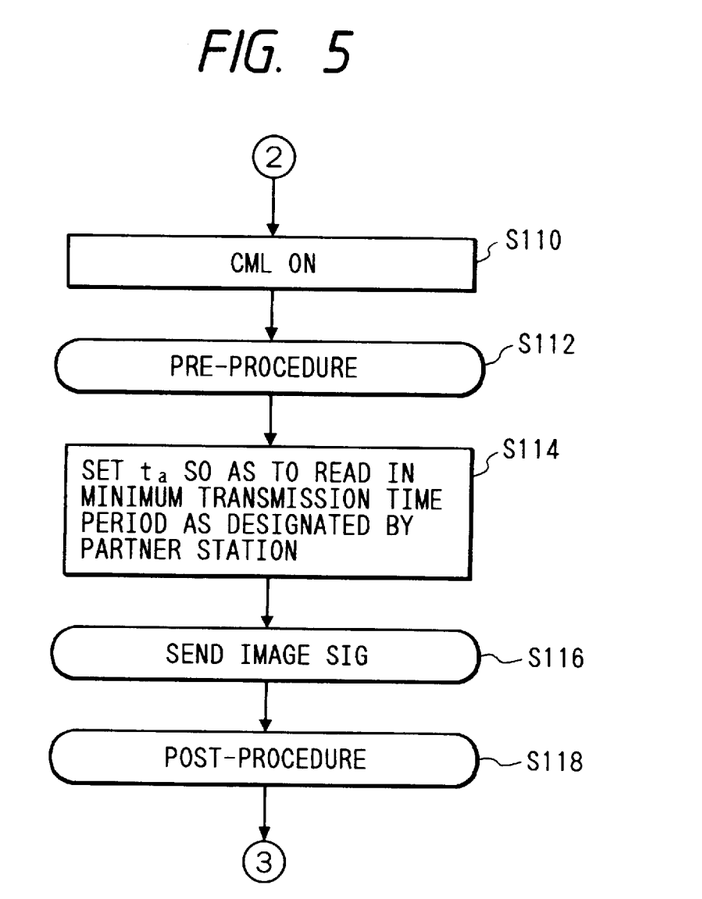
FIG. 5 is a flow chart of control of the controller 50 of FIG. 1B, FIGS. 6A, 6B and 6C are flow charts of control of the controller 50 of FIG. 1B, and FIGS. 7A and 7B are a flow chart of control of the controller 50 of FIG. 1B.

A step S112 represents a pre-protocol.

In a step S114, the store time of one line is set such that the signal is read in the minimum transmission time designated by the destination receiver. The store time of one line is outputted to the signal lines 50d and 50e and a light intensity (a current value of each of the 30 LED's) corresponding to the store time is outputted to the signal line 50c.

A step S116 represents the transmission of the image signal.

A step S118 represents a post-protocol.

(Embodiment 2)

When the ECM communication is elected in the direct transmission mode, the generation time of one line of read data may be set to a shortest possible time which permits the reading.

(Embodiment 3)

In the single copy mode, the generation time of one line of data is slightly shorter than the record time of one line in the previous embodiment. Alternatively, the information of a predetermined line may be initially stored in the memory and the generation time of one line may be made equal to the record time of one line.

(Embodiment 4)

In the above embodiments, the generation time of one line of read data is set as the store time of one line and the light intensity is adjusted accordingly. Specifically, the light intensity (the current value to each LED) is lowered in the read mode having a long store time, and the light intensity (the current value to each LED) is increased in the read mode having a short store time.

Alternatively, the store time may be fixed and the information of latter half may be thrown away depending on the generation time of one line of read data. Specifically, as shown in FIGS. 2B-1, 2B-2, the data in the store time $t_a$ may be used as the valid data and the data in the store time ($t_b-t_a$) may be thrown away.

A specific example of the control is shown in FIGS. 6A to 7B which show only differences from the control flow charts of FIGS. 3A to 5.

Figure 6A:
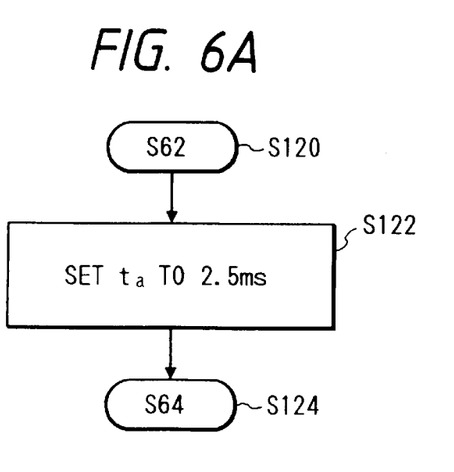

In FIG. 6A, a step S120 represent the step S62 of FIG. 3A.

In a step S122, the store time of one line is set to 2.5 ms. 8.00 (mA) is outputted to the signal lines 50c and 8.0 mA is supplied to each of the 30 LED's, and 2.5 (Ms) is outputted to the signal line 50e.

A step S124 represents the step S64 of FIG. 3A.

A step S126 (FIG. 6B) represents YES of the step S64 of FIG. 3A.

Figure 6B:
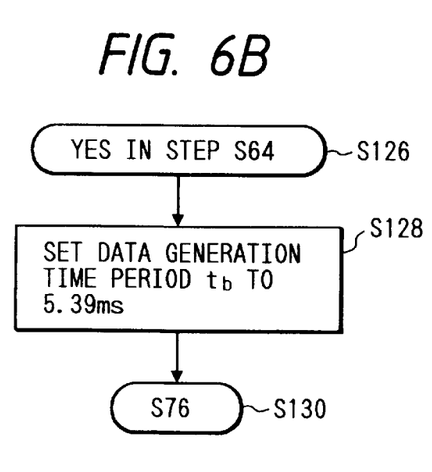

In a step S128, the generation time of one line of data is set to 5.39 ms. Specifically, 5.39 (ms) is outputted to the signal line 50d.

A step S130 represents the step S76 of FIG. 3A, and a step S132 (FIG. 6C) represents YES in the step S66 of FIG. 3A.

Figure 6C:
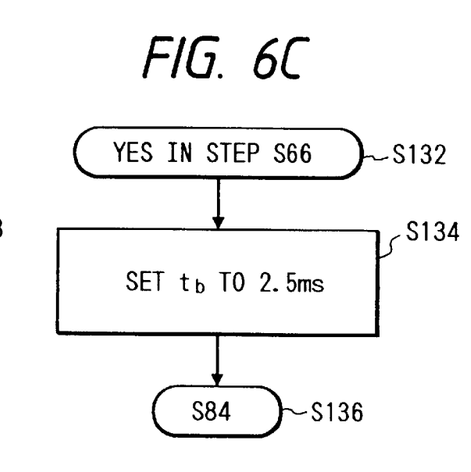

In a step S134, the generation time of one line of data is set to 2.5 ms. Specifically, 2.5 (ms) is outputted to the signal line 50d.

A step S136 represents the step S84 of FIG. 3B, and a step S138 (FIG. 7A) represents YES in the step S68 of FIG. 3A.

Figure 7A:
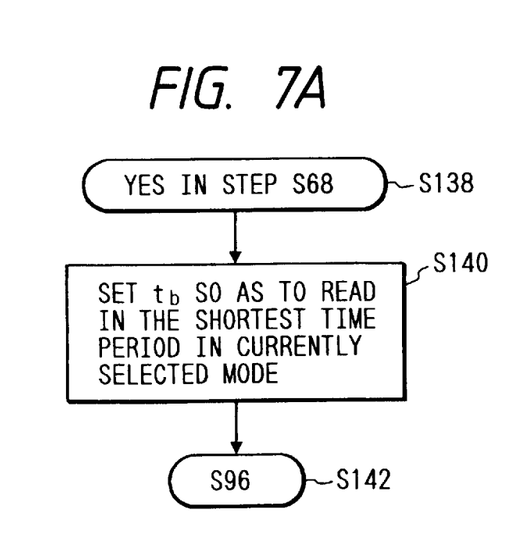

In a step S140, the generation time of one line of data is set to read the data in a shortest time in the mode (standard/fine/super fine) currently selected by the console unit. The time is no shorter than the store time of 2.5 ms. Specifically, the time is outputted to the signal line 50d.

A step S142 represents the step S96 of FIG. 4, and a step S144 (FIG. 7B) represents the step S112 of FIG. 5.

Figure 7B:
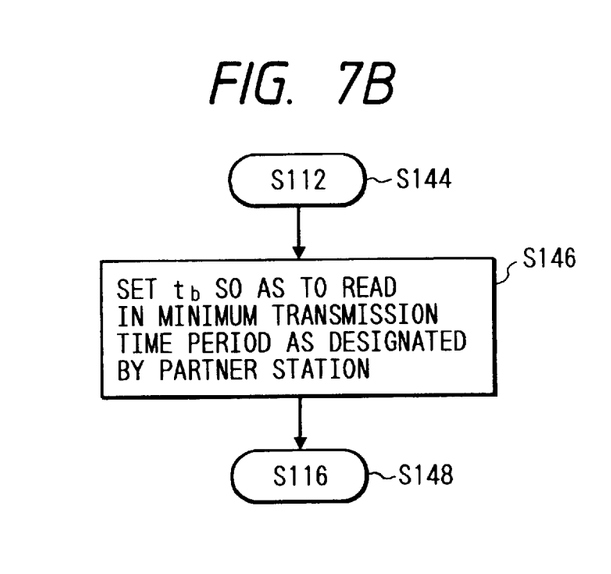

In a step S146, the generation time of one line of data is set such that the data is read in the shortest transmission time designated by the destination receiver. The time is no shorter than the store time 2.5 ms. Specifically, the time is outputted to the signal line 50d.

A step S148 represents the step S116 of FIG. 4.

As described hereinabove, in accordance with the present invention, in the single copy mode in the system in which the record time of one line is determined by the record condition (such as the LBP), the generation time of one line of data may be set slightly shorter than the record time of one line, and the memory for storing the read and record data permits the continuous read operation although it is definite so that the reading with a high image quality is attained.

In the single copy mode, the recording may be made after one page has been stored in the memory. In such a case, the problem of overflow of the information such as half-tone information from the memory is solved by the present invention.

What is claimed is:

1. A image forming apparatus comprising:

read means for reading a document sheet image at a predetermined reading period line by line;

memory means for storing the image data read by said read means;

record means for recording the image data on a record sheet at a predetermined recording period line by line;

selection one of means for selecting a first copy mode in which the image data read by said read means is stored in said memory means, and after the storing of at least one page of image data, the image data read from said memory means starts to be recorded by said record means, and a second copy mode in which the image data read by said read means starts to be recorded by said record means before the completion of the reading of one page of document sheet; and means for asynchronizing the reading period and the recording period when said select means selects the first copy mode, and synchronizing the reading period and the recording period when said select means selects the second copy mode.

2. A image forming apparatus according to claim 1, further comprising:

input means for inputting the number of copies by manual operation of an operator;

said selection means selecting the first copy mode when a multiple copy mode is selected by said input means, and selecting the second copy mode when a single copy mode is selected by said input means.

3. A image forming apparatus according to claim 1, wherein the reading period is variable and the recording period is fixed.

4. A image forming apparatus according to claim 1 wherein said read means includes a light source for illuminating the document sheet, and a light intensity of said light source is varied in accordance with the setting of the read time.

5. An image forming apparatus according to claim 1, wherein said image forming apparatus is a facsimile apparatus.

6. A image forming apparatus according to claim 1 wherein said record means cannot interrupt the record operation during the recording of one page of image data.

7. A image forming apparatus according to claim 1, wherein said record means is an electro-photographic printer.

8. A image forming apparatus according to claim 7 wherein said record means is a laser beam printer.

9. A method of copying in a image forming apparatus having a first copy mode in which a document sheet image is read at a predetermined reading period line by line, the read image data is stored in memory means, and after the completion of the storing of at least one page of image data, the image data read from said memory means starts to be recorded on a record sheet at a predetermined reading Period line by line, and a second copy mode in which the read image data starts to be recorded on the record sheet before the completion of the reading of one page of document sheet, comprising the steps of:

selecting one of the first copy mode and the second copy mode; and when the first copy mode is selected, asynchronizing the reading period and the recording period of the image data, and when the second copy mode is selected, synchronizing the reading period and the recording period of the image data.

10. A method of copying according to claim 9 further comprising the step of:

inputting the number of copies by a manual operation of an operator;

wherein when a multiple copy mode is designated in said input step, the first copy mode is selected in said selection step, and when a single copy mode is selected in said input step, the second copy mode is selected in said selection step.

11. A method of copying according to claim 9 wherein the document sheet is illuminated by a light source in reading the document sheet image and a light intensity of the light source is varied in accordance with the setting of the read time.

12. A method of copying according to claim 9 wherein the record operation of the image data cannot be interrupted during the recording of one page of image data.

13. A method of copying according to claim 9, wherein the recording is made by an electro-photographic printer.

14. A method of copying according to claim 13 wherein the recording is made by a laser beam printer.

15. A method according to claim 9, wherein the reading period is variable and the recording period is fixed.

16. A method according to claim 9, wherein said image forming apparatus is a facsimile apparatus.

* * * * *

UNITED STATES PATENT AND TRADEMARK OFFICE
CERTIFICATE OF CORRECTION

PATENT NO.  : 5,774,231
DATED       : June 30, 1998
INVENTOR(S) : TAKEHIRO YOSHIDA It is certified that error appears in the above-identified patent and that said Letters Patent is hereby corrected as shown below:

COLUMN 1 line 15, "integer, multiple" should read --integer multiple--;
   line 21, "unit 1," should read --unit,--; and
   line 62, "FIG, 1B" should read --FIG. 1B,--.

COLUMN 2 line 1, "chart" should read --charts--.

COLUMN 3 line 33, "change" should read --changes--; and
   line 43, "the" (second occurrence) should be deleted.
   line 43, "a" should read -- a sum --.

COLUMN 4 line 45, "off" should read --of--;
   line 46, "of" should read --off--; and
   line 53, "of" should read --if--.

UNITED STATES PATENT AND TRADEMARK OFFICE
CERTIFICATE OF CORRECTION

PATENT NO. : 5,774,231

DATED : June 30, 1998

INVENTOR(S): TAKEHIRO YOSHIDA

It is certified that error appears in the above-identified patent and that said Letters Patent is hereby corrected as shown below:

COLUMN 7 line 33, "A" should read --An--;
line 40, "Selection one of means for selecting" should read --Selection means for selecting one of--; and
line 55, "A" should read --An--.

COLUMN 8 line 1, "A" should read --An--;
line 4, "A" should read --An--; and "claim 1" should read --claim 1,--;
line 11, "A" should read --An-- and "claim 1" should read --claim 1,--
line 14, "A" should read --An--;
line 17, "A" should read --An-- and "claim 7" should read --claim 7,--;
line 19, "a" should read --an--;
line 24, "Period" should read --period--;
line 36, "claim 9" should read --claim 9,--;
line 45, "claim 9" should read --claim 9,--

UNITED STATES PATENT AND TRADEMARK OFFICE
CERTIFICATE OF CORRECTION

PATENT NO. : 5,774,231

DATED : June 30, 1998

INVENTOR(S) : TAKEHIRO YOSHIDA

It is certified that error appears in the above-identified patent and that said Letters Patent is hereby corrected as shown below:

<u>COLUMN 8</u> continued

```
line 50, "claim 9" should read --claim 9,--; and
line 55, "claim 13" should read --claim 13,--.
```

Signed and Sealed this

Eighth Day of June, 1999

Attest:

Q. TODD DICKINSON

*Attesting Officer*      *Acting Commissioner of Patents and Trademarks*